United States Patent
Chen et al.

(10) Patent No.: US 12,411,520 B2
(45) Date of Patent: Sep. 9, 2025

(54) DISPLAY HOUSING, RELATED DISPLAY DEVICE AND RELATED OUTER COVER

(71) Applicant: Wistron Corporation, New Taipei (TW)

(72) Inventors: Zhengjie Chen, New Taipei (TW); Guowei Huang, New Taipei (TW); Chunlei Zhao, New Taipei (TW)

(73) Assignee: Wistron Corporation, New Taipei (TW)

( * ) Notice: Subject to any disclaimer, the term of this patent is extended or adjusted under 35 U.S.C. 154(b) by 164 days.

(21) Appl. No.: 18/525,881

(22) Filed: Dec. 1, 2023

(65) Prior Publication Data
US 2025/0060779 A1 Feb. 20, 2025

(30) Foreign Application Priority Data
Aug. 16, 2023 (CN) .......................... 202311034620.2

(51) Int. Cl.
*G06F 1/16* (2006.01)
*G02F 1/1333* (2006.01)

(52) U.S. Cl.
CPC ...... *G06F 1/1607* (2013.01); *G02F 1/133325* (2021.01)

(58) Field of Classification Search
CPC .... G06F 1/1607; G06F 1/1681; G06F 1/1616; G06F 1/1679; G06F 1/162; G06F 1/1624; G06F 1/1615; G06F 1/1683; G06F 1/1677; G06F 1/1656; G06F 1/1654; G06F 1/1667; G06F 1/1686; H05K 5/0217; H05K 5/0204; H05K 5/0017; H05K 5/0018; H05K 5/0026; H05K 5/0221; H05K 5/061; H05K 5/10; H05K 5/13; H05K 7/1427
See application file for complete search history.

(56) References Cited

U.S. PATENT DOCUMENTS

| | | | | |
|---|---|---|---|---|
| 7,764,332 B2 * | 7/2010 | Zhang | ............... | G02F 1/133308 349/59 |
| 2011/0149198 A1 * | 6/2011 | Kim | ................... | G02F 1/133308 349/161 |
| 2011/0292315 A1 * | 12/2011 | Bae | .................... | G02F 1/133308 362/606 |
| 2016/0120041 A1 * | 4/2016 | Lee | ......................... | H04N 5/64 361/679.01 |
| 2017/0318694 A1 * | 11/2017 | Yun | ...................... | H05K 5/0217 |
| 2020/0027391 A1 * | 1/2020 | Cho | ..................... | H10K 77/111 |
| 2021/0116958 A1 * | 4/2021 | Ryu | ................... | H10K 50/8426 |
| 2023/0194927 A1 * | 6/2023 | Lee | .................. | G02F 1/133621 362/97.3 |
| 2024/0184325 A1 * | 6/2024 | Wang | .................... | G02F 1/1333 |

FOREIGN PATENT DOCUMENTS

TW    202011095 A    3/2020

* cited by examiner

*Primary Examiner* — Abhishek M Rathod
(74) *Attorney, Agent, or Firm* — Winston Hsu

(57) ABSTRACT

A display housing is provided and includes an outer cover, a lateral shell component and a rear shell component. The outer cover includes a first assembling member and a second assembling member. The first assembling member includes an opening structure. The second assembling member is detachably connected to the opening structure. The lateral shell component is detachably connected to the outer cover. The rear shell component is detachably connected to the outer cover and the lateral shell component. Besides, a related display device and a related outer cover are also provided.

18 Claims, 15 Drawing Sheets

DISPLAY HOUSING, RELATED DISPLAY DEVICE AND RELATED OUTER COVER

BACKGROUND OF THE INVENTION

1. Field of the Invention

The present invention relates to a display housing, a related display device and a related outer cover, and more specifically, to a display housing with a high recycling rate, a light weight and a reduced packaging cost, a related display device and a related outer cover.

2. Description of the Prior Art

With rise of the environmental awareness, use of resources and recycle and treatment of wastes become more and more important. As for a display, some mechanical elements of the display, e.g., a metal back plate and a shielding cover, and optical elements of the display cannot be recycled, i.e., have a zero recycling rate, and electronic elements of the display only have approximately a 10 percent recycling rate. Therefore, an overall recycling rate of the display is low. Furthermore, if the display is heavier, the display requires more packaging material for transportation, which causes more carbon emissions during packaging and/or transporting. Therefore, it is a concerned topic to increase the overall material recycling rate of the display and reduce the weight of the display for satisfying requirements of carbon reduction/carbon neutrality.

SUMMARY OF THE INVENTION

It is an objective of the present invention to provide a display housing with a high recycling rate, a light weight and a reduced packaging cost, a related display device and a related outer cover.

In order to achieve the aforementioned objective, the present invention discloses a display housing. The display housing includes an outer cover, a lateral shell component and a rear shell component. The outer cover includes a first assembling member and a second assembling member. The first assembling member includes an opening structure. The second assembling member is detachably connected to the opening structure. The lateral shell component is detachably connected to the outer cover. The rear shell component is detachably connected to the outer cover and the lateral shell component.

According to an embodiment of the present invention, the first assembling member further includes a first lateral part, a second lateral part, a third lateral part and a fourth lateral part. The first lateral part, the second lateral part, the third lateral part and the fourth lateral part form the opening structure cooperatively.

According to an embodiment of the present invention, at least one first engaging portion is formed on the first lateral part. At least one second engaging portion is formed on the second lateral part. At least one third engaging portion and at least one fourth engaging portion are formed on the second assembling member, and the at least one third engaging portion and the at least one fourth engaging portion are configured to respectively engage with the at least one first engaging portion and the at least one second engaging portion.

According to an embodiment of the present invention, when the at least one third engaging portion and the at least one fourth engaging portion respectively engage with the at least one first engaging portion and the at least one second engaging portion, a stopper of the at least one first engaging portion abuts against the at least one third engaging portion.

According to an embodiment of the present invention, a first extending portion is further formed on the first lateral part. A second extending portion is formed on the third lateral part. A third extending portion is formed on the fourth lateral part. A restraining portion is further formed on the second lateral part, and the first extending portion, the second extending portion, the third extending portion and the restraining portion abut against the second assembling member when the at least one third engaging portion and the at least one fourth engaging portion respectively engage with the at least one first engaging portion and the at least one second engaging portion.

According to an embodiment of the present invention, the first assembling member includes a panel positioning structure configured to position a panel structure of a panel assembly. The second assembling member includes a light positioning structure configured to position a light source of a backlight assembly. An inserting portion is formed by and located between the second assembling member and the first assembling member and configured to accommodate a portion of an optical film structure of the backlight assembly, and a disposing portion is formed by and located between the lateral shell component and the second assembling member and configured to accommodate a portion of a circuit board.

According to an embodiment of the present invention, the display housing further includes at least one reinforcement component disposed on the first assembling member and configured to increase a structural strength of the first assembling member.

According to an embodiment of the present invention, the lateral shell component includes a first portion, a second portion and a third portion. The first portion of the lateral shell component is located adjacent to a first side of the outer cover. The second portion of the lateral shell component is located adjacent to a second side of the outer cover opposite to the first side of the outer cover and detachably combined with the outer cover. The third portion of the lateral shell component is connected to the first portion and the second portion of the lateral shell component. The second portion of the lateral shell component is detachably combined with the second assembling member. A disposing portion is formed by and located between the second portion of the lateral shell component and the second assembling member. The rear shell component is detachably combined with the first assembling member, the second assembling member, the second portion of the lateral shell component and the third portion of the lateral shell component.

According to an embodiment of the present invention, the first assembling member includes a frame body and a main body detachably combined with the frame body.

According to an embodiment of the present invention, at least one engaging structure is formed on the main body. At least one cooperating structure is formed on the frame body, and the main body is detachably combined with the frame body by the at least one engaging structure and the at least one cooperating structure.

In order to achieve the aforementioned objective, the present invention further discloses a display device. The display device includes a panel assembly, a backlight assembly and a display housing. The display housing is configured to position the panel assembly and the backlight assembly. The display housing includes an outer cover, a lateral shell component and a rear shell component. The outer cover includes a first assembling member and a second assembling member. The first assembling member includes an opening structure. The second assembling member is detachably connected to the opening structure. The lateral shell component is detachably connected to the outer cover. The rear shell component is detachably connected to the outer cover and the lateral shell component.

According to an embodiment of the present invention, the first assembling member includes a first lateral part, a second lateral part, a third lateral part and a fourth lateral part. The first lateral part, the second lateral part, the third lateral part and the fourth lateral part form the opening structure cooperatively.

According to an embodiment of the present invention, at least one first engaging portion is formed on the first lateral part. At least one second engaging portion is formed on the second lateral part. At least one third engaging portion and at least one fourth engaging portion are formed on the second assembling member, and the at least one third engaging portion and the at least one fourth engaging portion are configured to respectively engage with the at least one first engaging portion and the at least one second engaging portion.

According to an embodiment of the present invention, when the at least one third engaging portion and the at least one fourth engaging portion respectively engage with the at least one first engaging portion and the at least one second engaging portion, a stopper of the at least one first engaging portion abuts against the at least one third engaging portion.

According to an embodiment of the present invention, a first extending portion is further formed on the first lateral part. A second extending portion is formed on the third lateral part. A third extending portion is formed on the fourth lateral part. A restraining portion is further formed on the second lateral part, and the first extending portion, the second extending portion, the third extending portion and the restraining portion abut against the second assembling member when the at least one third engaging portion and the at least one fourth engaging portion respectively engage with the at least one first engaging portion and the at least one second engaging portion.

According to an embodiment of the present invention, the panel assembly includes a panel structure and a circuit board. The first assembling member includes a panel positioning structure configured to position the panel structure. The backlight assembly includes a light source and an optical film structure. The second assembling member includes a light positioning structure configured to position the light source. An inserting portion is formed by and located between the second assembling member and the first assembling member and configured to accommodate a portion of the optical film structure, and a disposing portion is formed by and located between the lateral shell component and the second assembling member and configured to accommodate a portion of the circuit board.

According to an embodiment of the present invention, the display housing further includes at least one reinforcement component disposed on the first assembling member and configured to increase a structural strength of the first assembling member.

According to an embodiment of the present invention, the lateral shell component includes a first portion, a second portion and a third portion. The first portion of the lateral shell component is located adjacent to a first side of the outer cover. The second portion of the lateral shell component is located adjacent to a second side of the outer cover opposite to the first side of the outer cover and detachably combined with the outer cover. The third portion of the lateral shell component is connected to the first portion and the second portion of the lateral shell component. The second portion of the lateral shell component is detachably combined with the second assembling member. A disposing portion is formed by and located between the second portion of the lateral shell component and the second assembling member, and the rear shell component is detachably combined with the first assembling member, the second assembling member, the second portion of the lateral shell component and the third portion of the lateral shell component.

In order to achieve the aforementioned objective, the present invention further discloses an outer cover. The outer cover includes a first assembling member and a second assembling member. The first assembling member includes an opening structure, a first lateral part, a second lateral part, a third lateral part and a fourth lateral part. The first lateral part, the second lateral part, the third lateral part and the fourth lateral part form the opening structure cooperatively. At least one first engaging portion is formed on the first lateral part, and at least one second engaging portion is formed on the second lateral part. The second assembling member is detachably connected to the opening structure, and at least one third engaging portion and at least one fourth engaging portion are formed on the second assembling member and configured to respectively engage with the at least one first engaging portion and the at least one second engaging portion.

According to an embodiment of the present invention, the first assembling member includes a frame body and a main body. At least one engaging structure is formed on the main body. At least one cooperating structure is formed on the frame body, and the main body is detachably combined with the frame body by the at least one engaging structure and the at least one cooperating structure.

In summary, the display housing of the present invention utilizes the outer cover having the first assembling member and the second assembling member to position the panel assembly and the backlight assembly, and further utilizes the outer cover and the lateral shell component to form the disposing portion for accommodating the circuit board. The aforementioned configuration does not require any metal back plate or any shielding cover or any other element which cannot be recycled. Therefore, the present invention has a high recycling rate. Besides, since the present invention is lightweight, the present invention requires less packaging material, which causes less carbon emissions during packaging and/or transporting. Therefore, the present invention contributes to environmental sustainability.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
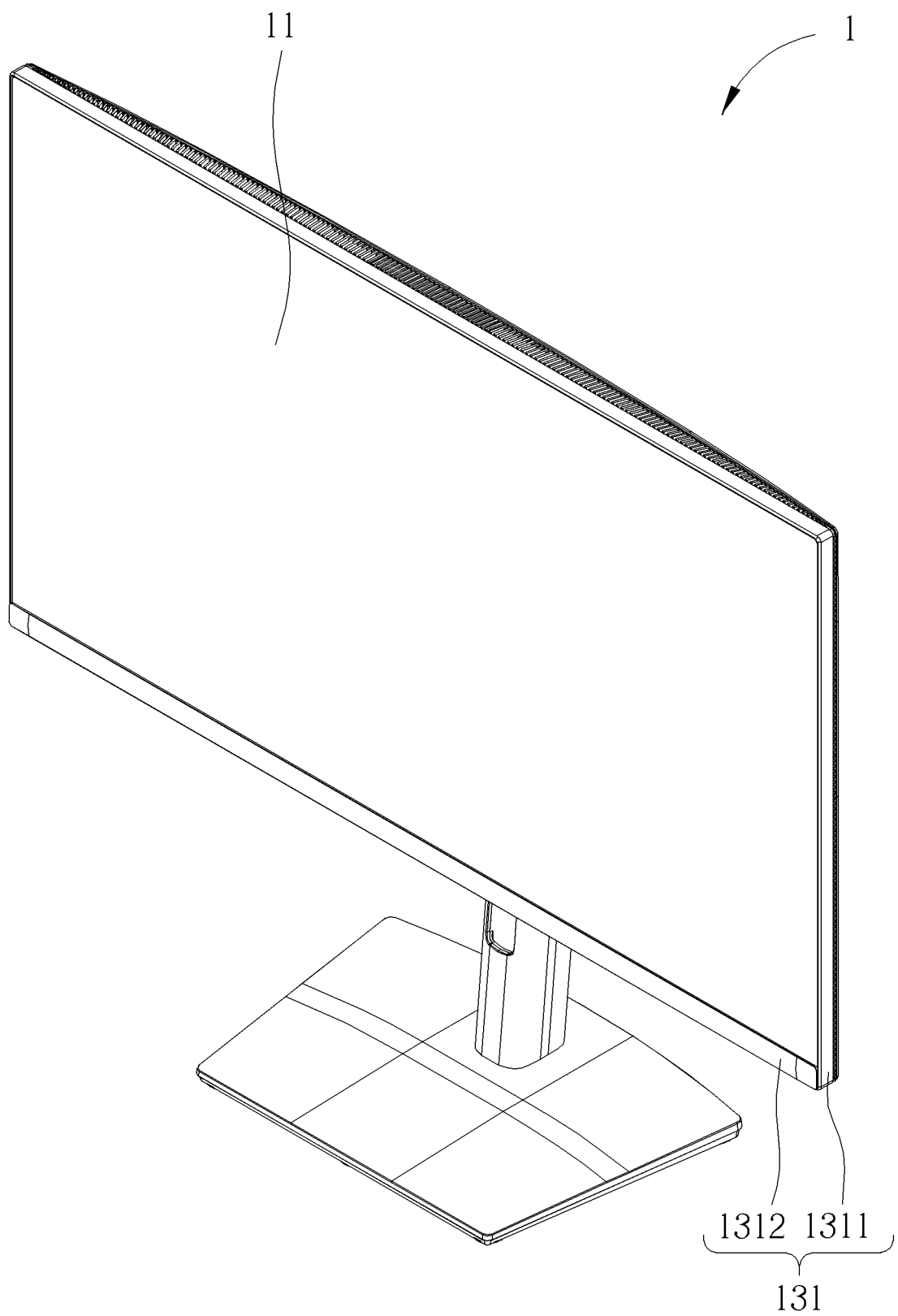
FIG. 1 and FIG. 2 are schematic diagrams of a display device at different views according to a first embodiment of the present invention.
Figure 2:
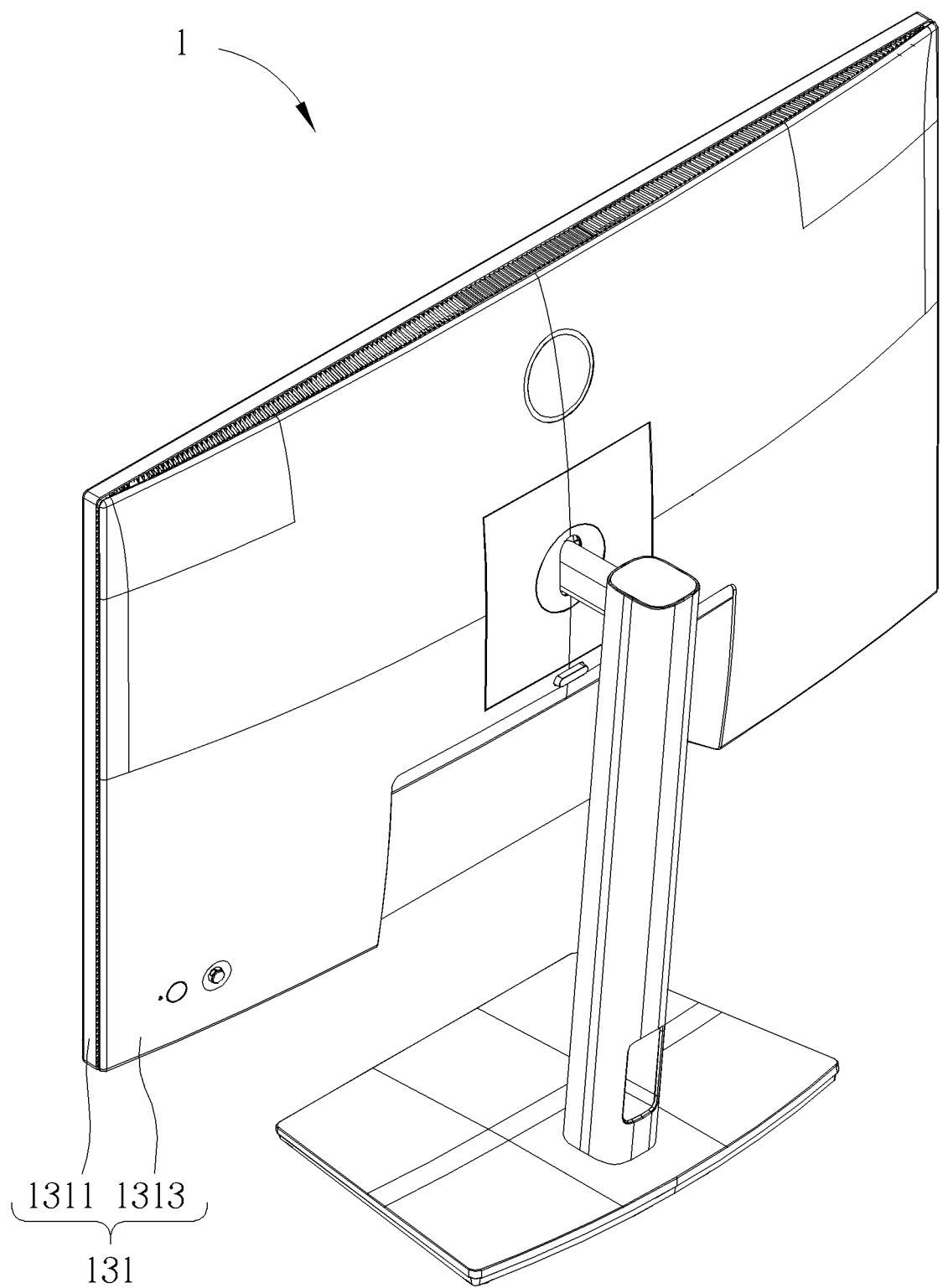
Figure 3:
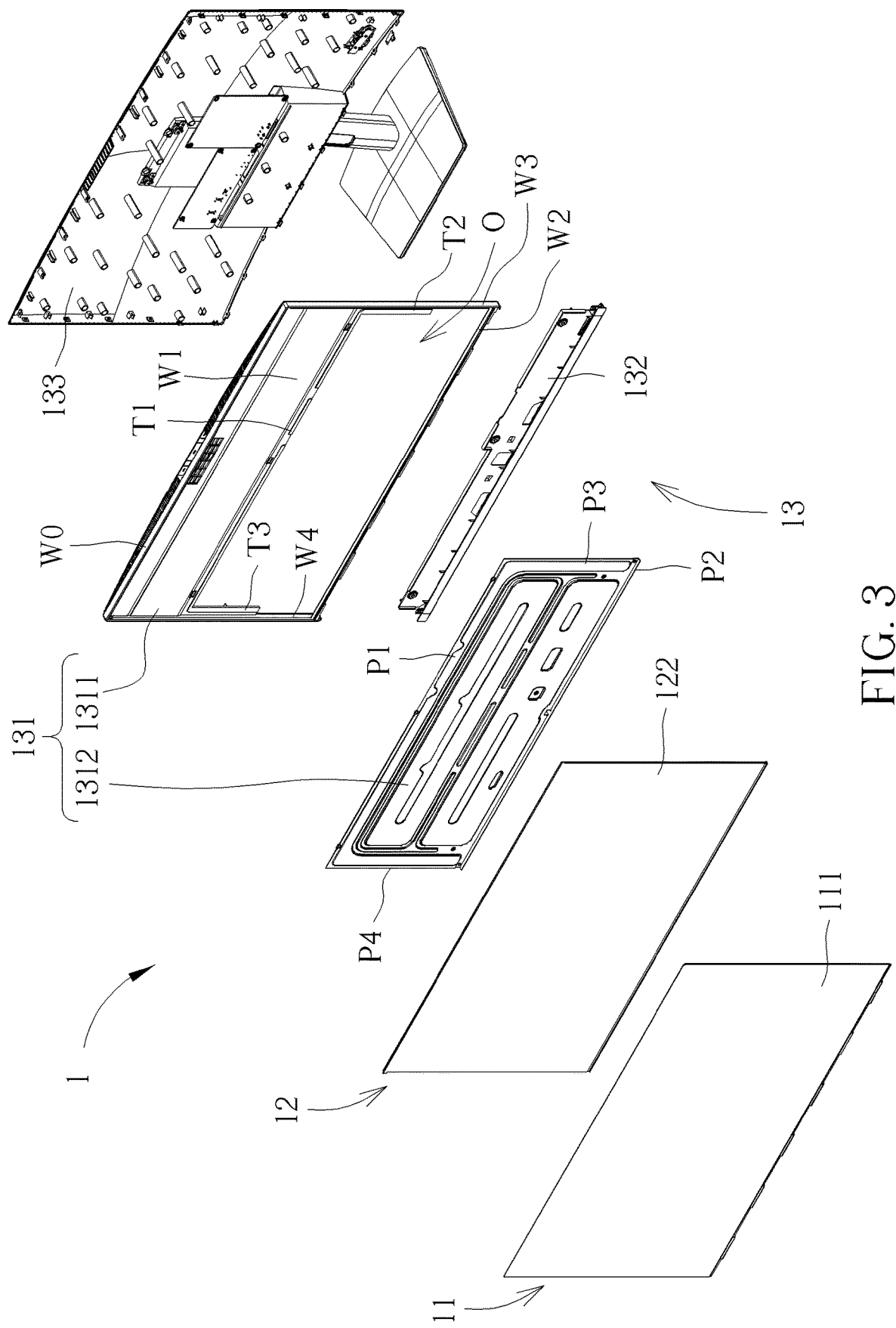
FIG. 3 and FIG. 4 are exploded diagrams of the display device at different views according to the first embodiment of the present invention.
Figure 4:
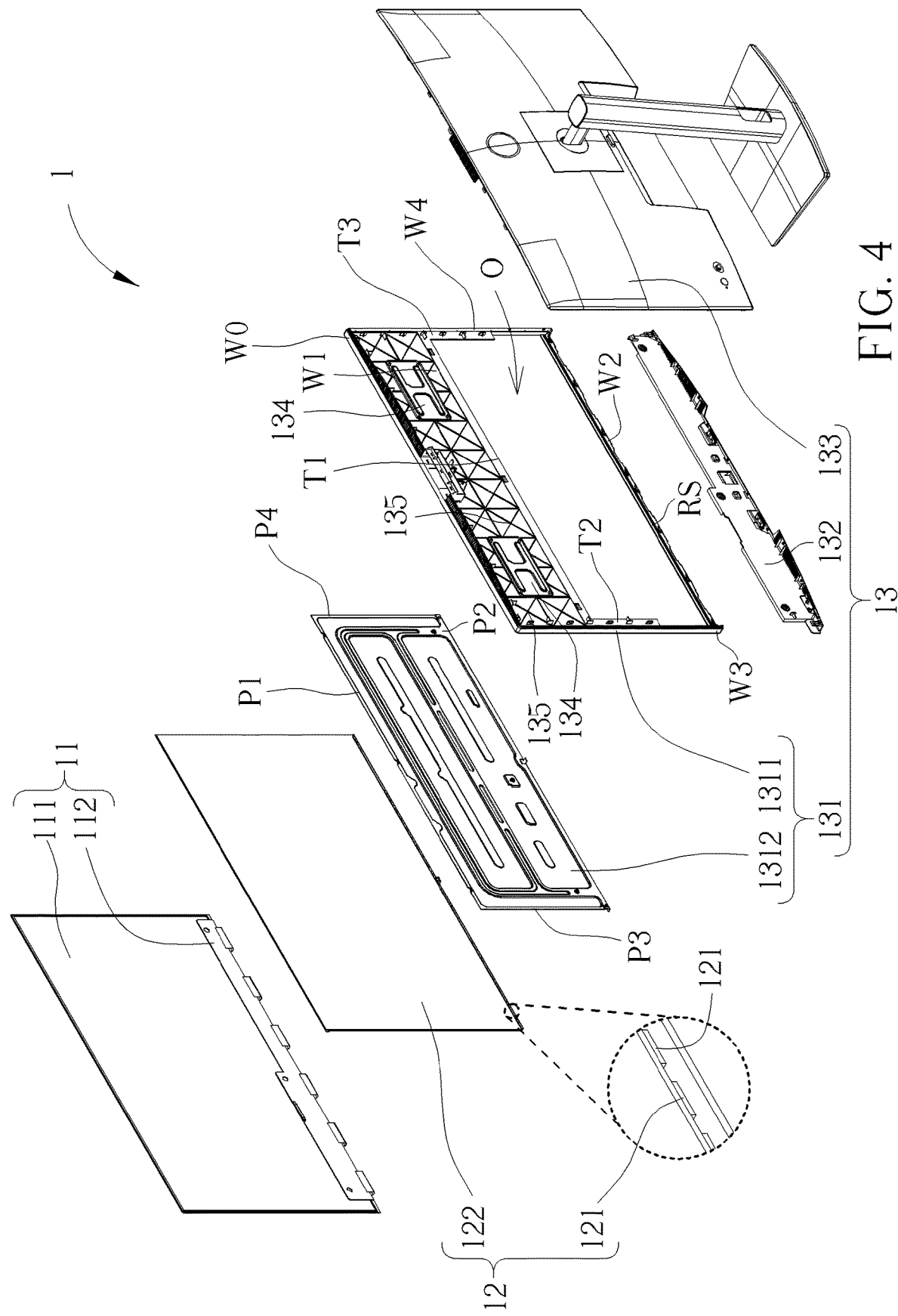

Please refer to FIG. 1 to FIG. 4. FIG. 1 and FIG. 2 are schematic diagrams of a display device 1 at different views according to a first embodiment of the present invention. FIG. 3 and FIG. 4 are exploded diagrams of the display device 1 at different views according to the first embodiment of the present invention. As shown in FIG. 1 to FIG. 4, the display device 1 includes a panel assembly 11, a backlight assembly 12 and a display housing 13. The panel assembly 11 is for displaying images. The backlight assembly 12 is for providing light for the panel assembly 11. The display housing 13 is for positioning the panel assembly 11 and the backlight assembly 12. In this embodiment, the display device 1 can be a desktop display. However, the present invention is not limited to this embodiment. For example, in another embodiment, the display device can be a car display, a commercial display, a liquid-crystal-display television, a laptop display or an all-in-one display.

Figure 5:
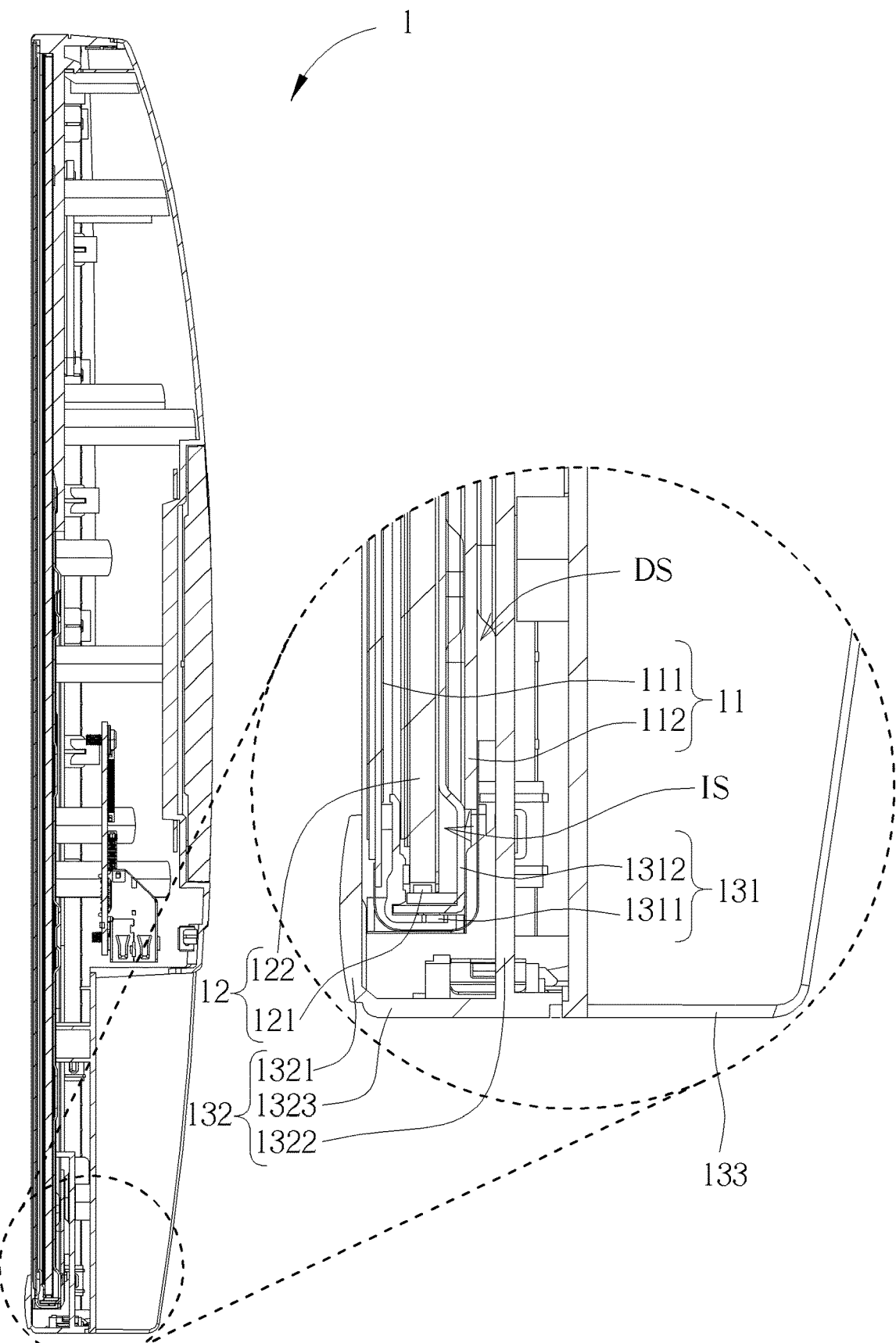
FIG. 5 is a partial enlarged diagram of the display device according to the first embodiment of the present invention.
Figure 6:
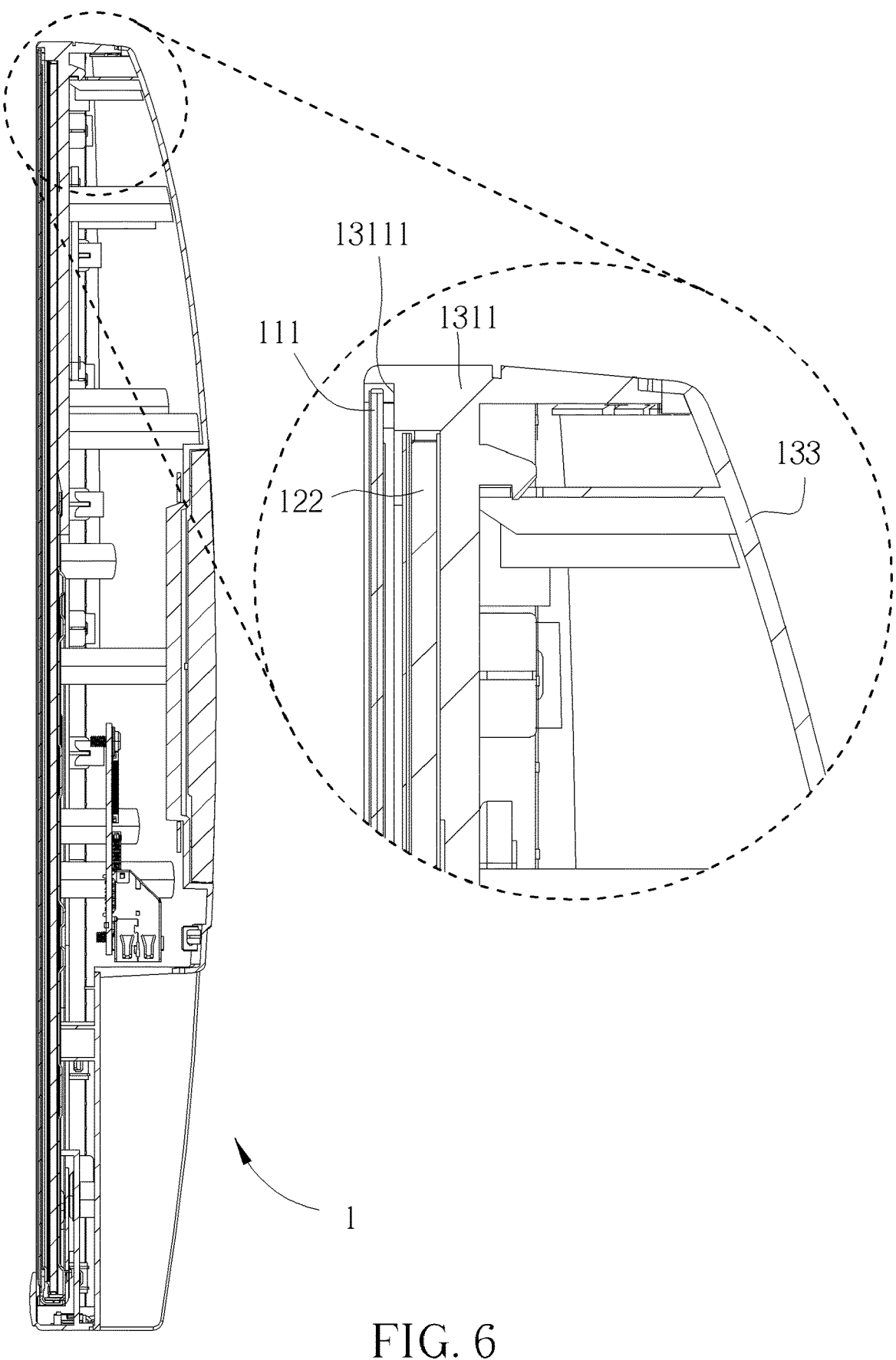
FIG. 6 is another partial enlarged diagram of the display device at a different view according to the first embodiment of the present invention.

Please refer to FIG. 3 to FIG. 6. FIG. 5 is a partial enlarged diagram of the display device 1 according to the first embodiment of the present invention. FIG. 6 is another partial enlarged diagram of the display device 1 at a different view according to the first embodiment of the present invention. As shown in FIG. 3 to FIG. 6, in this embodiment, the panel assembly 11 can include a panel structure 111 and a circuit board 112. The panel structure 111 can be a sandwich panel structure which includes two glass substrates and a liquid crystal layer between the two glass substrates. The circuit board 112 can be a driving circuit board which is for controlling the panel structure 111 to display different images. The backlight assembly 12 can include a light source 121 and an optical film structure 122. The light source 121 can include at least one light bar which includes a plurality of light emitting components, e.g., light emitting diodes. The optical film structure 122 can be a composite optical film structure which includes a diffusion film, a prism film, a polarizing film and a light guide plate. However, the present invention is not limited to this embodiment.

Furthermore, as shown in FIG. 3 to FIG. 6, the display housing 13 includes an outer cover 131, a lateral shell component 132 detachably connected to the outer cover 131 and a rear shell component 133 detachably connected to the outer cover 131 and the lateral shell component 132. The outer cover 131 includes a first assembling member 1311 and a second assembling member 1312. The second assembling member 1312 is detachably connected to the first assembling member 1311, so as to be combined with the first assembling member 1311. The lateral shell component 132 includes a first portion 1321, a second portion 1322 and a third portion 1323. The first portion 1321 of the lateral shell component 132 is located at a first side of the outer cover 131, e.g., a front side of the outer cover 131. The second portion 1322 of the lateral shell component 132 is located at a second side of the outer cover 131 opposite to the first side of the outer cover 131, e.g., a rear side of the outer cover 131, and detachably connected to the second assembling member 1312 of the outer cover 131, so as to be combined with the second assembling member 1312 of the outer cover 131. The third portion 1323 of the lateral shell component 132 is connected to the first portion 1321 and the second portion 1322 of the lateral shell component 132. The rear shell component 133 is detachably connected to the second assembling member 1312 of the outer cover 131 and the lateral shell component 132, so as to be combined with the second assembling member 1312 of the outer cover 131 and the lateral shell component 132. However, the present invention is not limited to this embodiment. For example, in another embodiment, the rear shell component and the second portion of the lateral shell component both can be detachably combined with the first assembling member of the outer cover. Alternatively, in another embodiment, the rear shell component and the second portion of the lateral shell component can be detachably combined with one and the other one of the first assembling member and the second assembling member of the outer cover, respectively.

Figure 7:
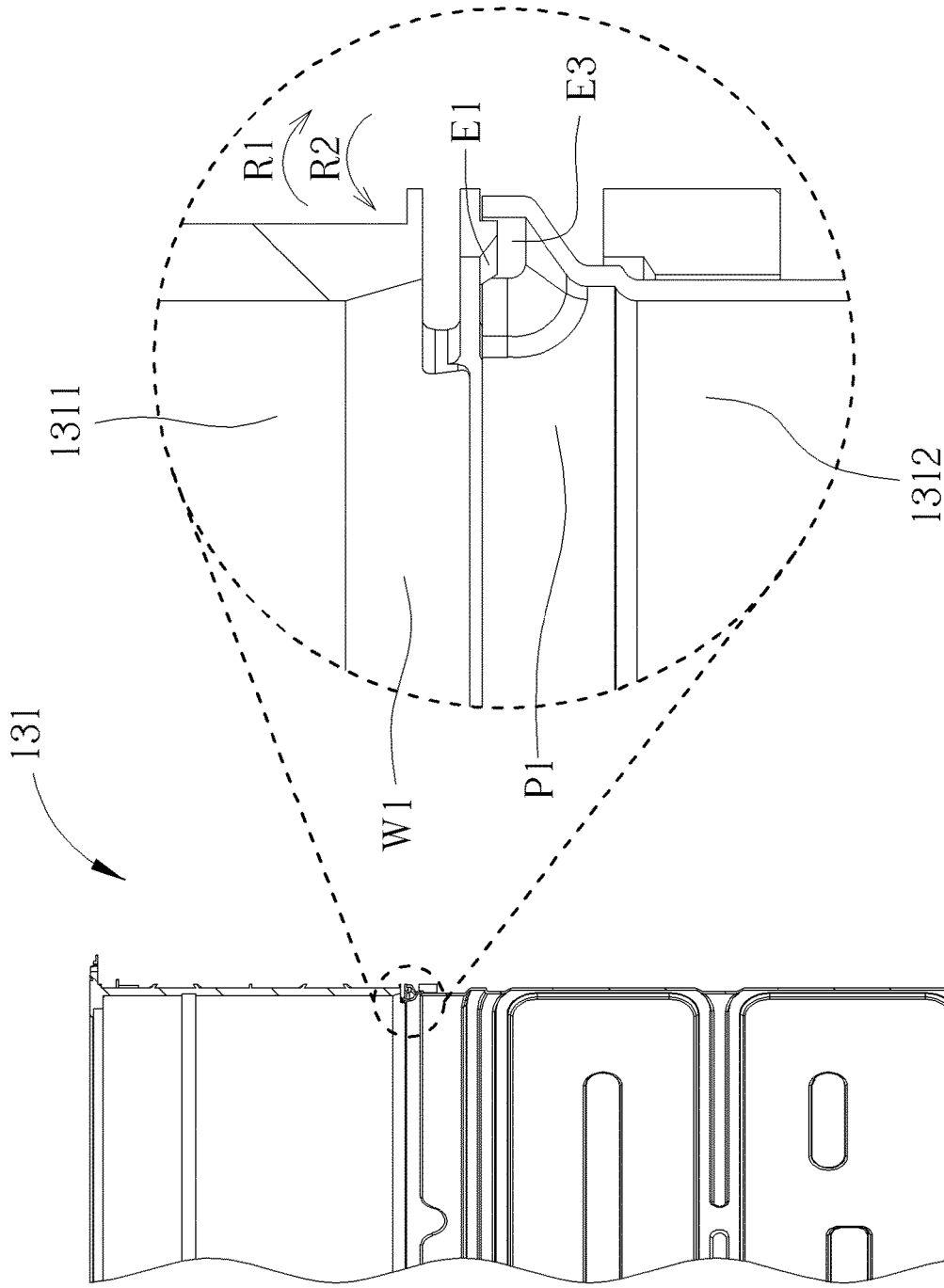
FIG. 7 is a partial enlarged diagram of an outer cover according to the first embodiment of the present invention.
Figure 8:
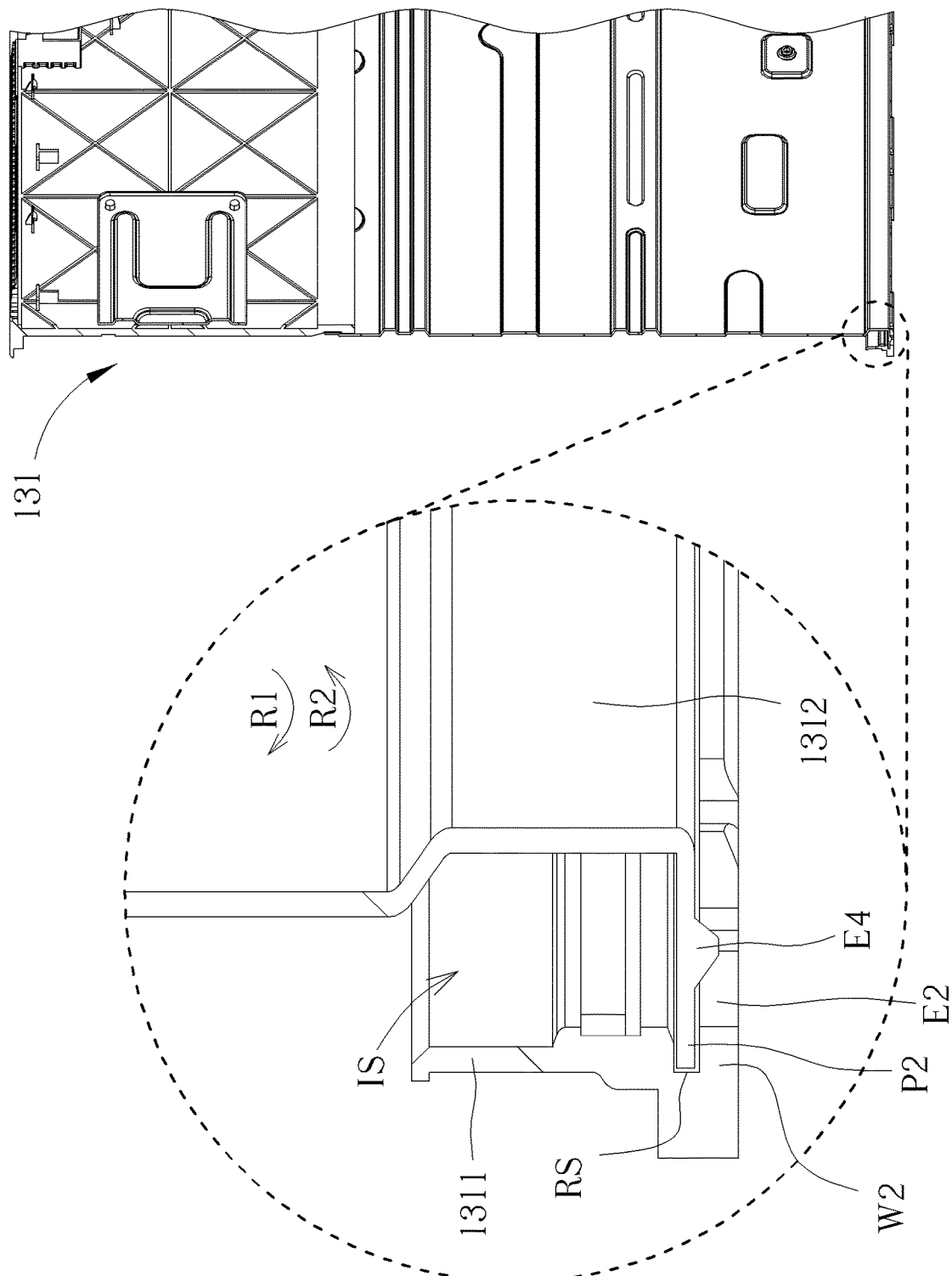
FIG. 8 is another partial enlarged diagram of the outer cover according to the first embodiment of the present invention.

Specifically, please refer to FIG. 3 to FIG. 8. FIG. 7 is a partial enlarged diagram of the outer cover 131 according to the first embodiment of the present invention. FIG. 8 is another partial enlarged diagram of the outer cover 131 according to the first embodiment of the present invention. As shown in FIG. 3 to FIG. 8, the first assembling member 1311 includes an opening structure O. The second assembling member 1312 is detachably connected to or combined with the opening structure O. More specifically, the first assembling member 1311 further includes a first lateral part W0, a second lateral part W2, a third lateral part W3 and a fourth lateral part W4. The first lateral part W0, the second lateral part W2, the third lateral part W3 and the fourth lateral part W4 form the opening structure O cooperatively. The first lateral part W0 and the second lateral part W2 are opposite to each other. The third lateral part W3 and the fourth lateral part W4 are opposite to each other and connected to the first lateral part W0 and the second lateral part W2. The first lateral part W0, the second lateral part W2, the third lateral part W3 and the fourth lateral part W4 form a rectangular frame structure. The first lateral part W0, the second lateral part W2, the third lateral part W3 and the fourth lateral part W4 can respectively abut against a first outer edge P1, a second outer edge P2, a third outer edge P3 and a fourth outer edge P4 of the second assembling member 1312 for restraining a translation of the second assembling member 1312 relative to the first assembling member 1311 along an up-down direction or a left-right direction.

Figure 9:
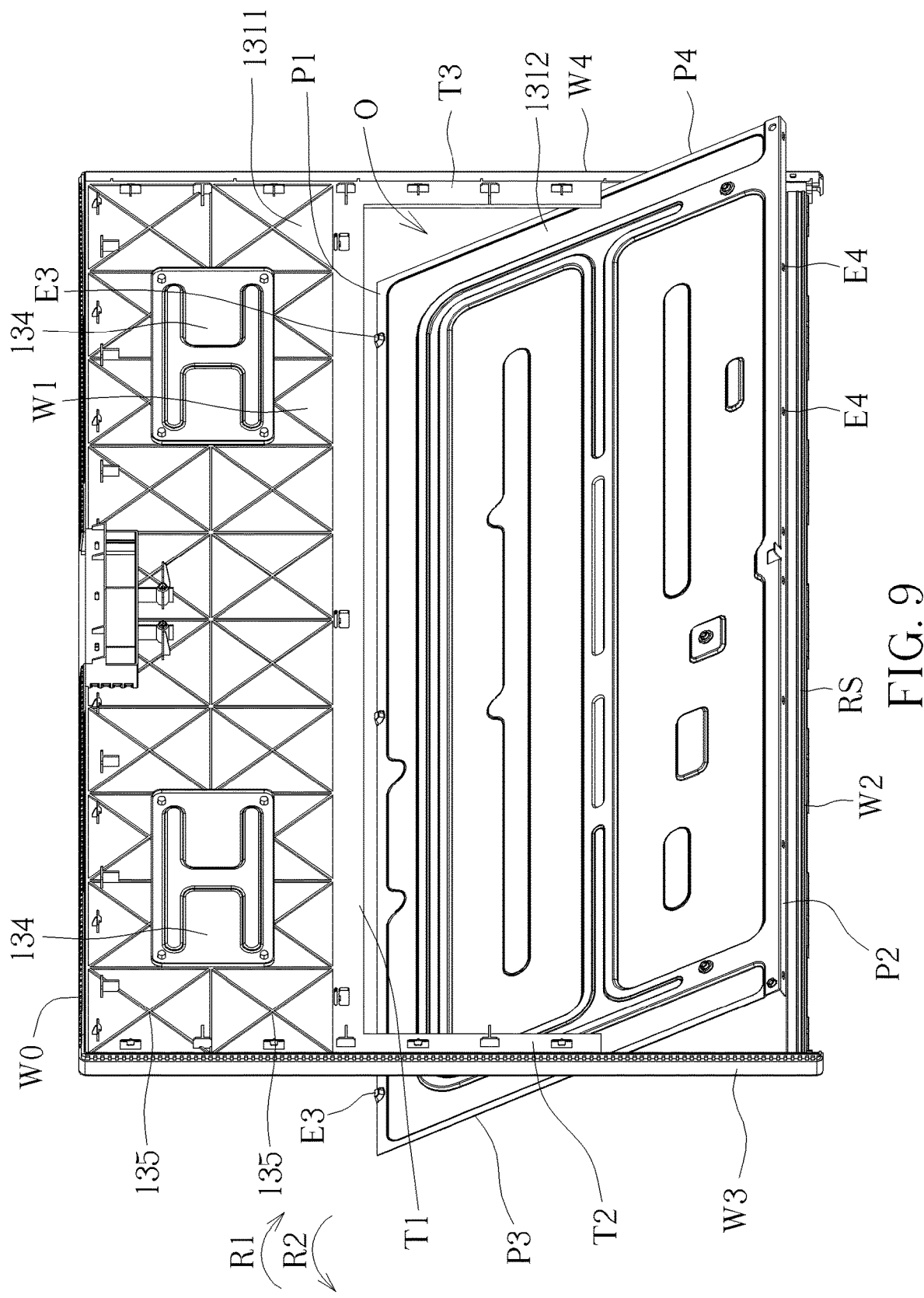
FIG. 9 is a diagram illustrating a first assembling member and a second assembling member combined together according to the first embodiment of the present invention.

Please refer to FIG. 5 to FIG. 9. FIG. 9 is a diagram illustrating the first assembling member 1311 and the second assembling member 1312 combined together according to the first embodiment of the present invention. As shown in FIG. 5 to FIG. 9, in this embodiment, in order to facilitate the second assembling member 1312 to be combined with the first assembling member 1311, the first lateral part W0 includes a vertical wall W1. A plurality of first engaging portions E1 are formed on the vertical wall W1. A plurality of second engaging portions E2 are formed on the second lateral part W2. A plurality of third engaging portions E3 are formed on the first outer edge P1 of the second assembling member 1312 and configured to engage with the plurality of the first engaging portions E1. A plurality of fourth engaging portions E4 are formed on the second outer edge P2 of the second assembling member 1312 and configured to engage with the plurality of the second engaging portions E2. The plurality of third engaging portions E3 and the plurality of fourth engaging portions E4 can respectively engage with the plurality of first engaging portions E1 and the plurality of second engaging portions E2 by a rotating movement of the second assembling member 1312 relative to the first assembling member 1311 along a first rotating direction R1. In other words, in this embodiment, in order to combine the second assembling member 1312 with the first assembling member 1311, the second assembling member 1312 can be disposed obliquely through the opening structure O and then rotated relative to the first assembling member 1311 along the first rotating direction R1 until the third engaging portions E3 and the fourth engaging portions E4 respectively engage with the first engaging portions E1 and the second engaging portions E2.

Specifically, the first engaging portion E1 can be an engaging lug having a guiding surface and a blocking surface. The third engaging portion E3 can be an engaging recess configured to cooperate with the guiding surface and the blocking surface of the first engaging portion E1. The guiding surface of the first engaging portion E1 is configured to guide the third engaging portion E3 to pass over the first engaging portion E1 along the first rotating direction R1. The blocking surface of the first engaging portion E1 is configured to block the third engaging portion E3 for preventing the third engaging portion E3 from disengaging from the first engaging portion E1 along a second rotating direction R2 opposite to the first rotating direction R1. The fourth engaging portion E4 can be an engaging protrusion having a guiding surface and a blocking surface. The second engaging portion E2 can be an engaging notch configured to cooperate with the guiding surface and the blocking surface of the fourth engaging portion E4. The guiding surface of the fourth engaging portion E4 is configured to guide the fourth engaging portion E4 to engage with the second engaging portion E2 along the first rotating direction R1. The blocking surface of the fourth engaging portion E4 is configured to block the second engaging portion E2 for preventing the fourth engaging portion E4 from disengaging from the second engaging portion E2 along the second rotating direction R2.

However, the numbers and the structures of the first engaging portion, the second engaging portion, the third engaging portion and the fourth engaging portion are not limited to this embodiment. It depends on practical demands. For example, in another embodiment, there can be only one first engaging portion formed on the vertical wall, one second engaging portion formed on the second lateral part, one third engaging portion formed on the second assembling member and one fourth engaging portion formed on the second assembling member. The second engaging portion and the third engaging portion can be an engaging protrusion or an engaging lug having a guiding surface and a blocking surface, and the first engaging portion and the fourth engaging portion can respectively be an engaging notch or an engaging recess configured to cooperate with the second engaging portion and the third engaging portion.

Understandably, in another embodiment, the first assembling member and the second assembling member can be combined with each other, e.g., by a screwing, hot-melt bonding, double-sided adhesive or dovetail fitting manner.

In addition, in this embodiment, as shown in FIG. 5 to FIG. 9, in order to prevent an excessive rotating movement of the second assembling member 1312 relative to the first assembling member 1311 along the first rotating direction R1, a first extending portion T1 is formed on the vertical wall W1. A second extending portion T2 is formed on the third lateral part W3. A third extending portion T3 is formed on the fourth lateral part W4. A restraining portion RS is formed on the second lateral part W2. The first extending portion T1, the second extending portion T2, the third extending portion T3 and the restraining portion RS are configured to abut against the second assembling member 1312 for restraining a rotating angle of the second assembling member 1312 relative to the first assembling member 1311 along the first rotating direction R1 when the second assembling member 1312 rotates relative to the first assembling member 1311 along the first rotating direction R1. Specifically, the first extending portion T1, the second extending portion T2 and the third extending portion T3 can be extending blocking plates configured to respectively abut against the first outer edge P1, the third outer edge P3 and the fourth outer edge P4 of the second assembling member 1312. The restraining portion RS can be a restraining indentation configured to partially accommodate and block the second outer edge P2 of the second assembling member 1312. However, the present invention is not limited to this embodiment. For example, in another embodiment, at least one of the first extending portion, the second extending portion, the third extending portion and the restraining portion can be omitted.

Figure 10:
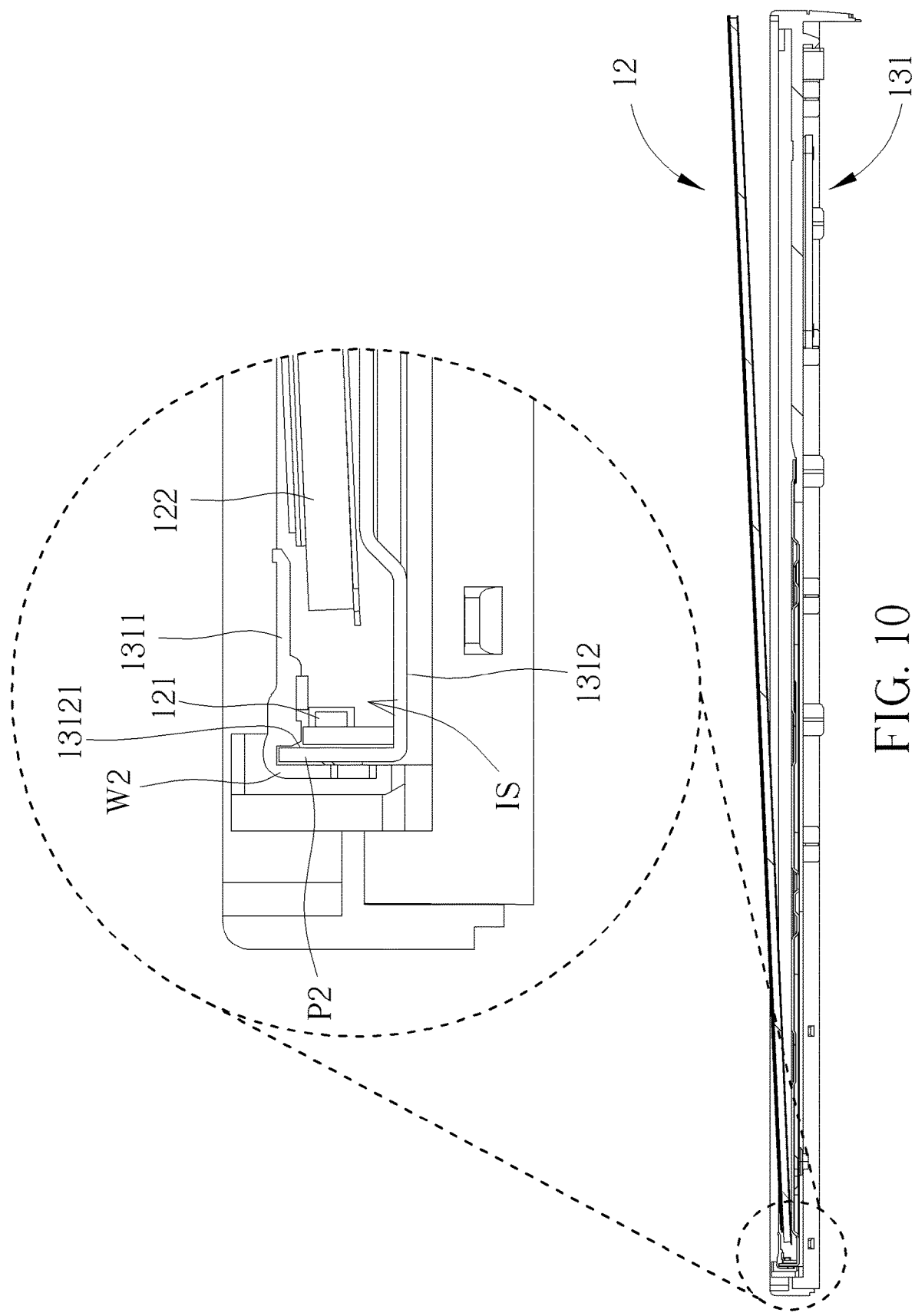
FIG. 10 is a diagram illustrating the outer cover and a backlight assembly combined together according to the first embodiment of the present invention.

Please refer to FIG. 5, FIG. 6, FIG. 8 and FIG. 10. FIG. 10 is a diagram illustrating the outer cover 131 and the backlight assembly 12 combined together according to the first embodiment of the present invention. As shown in FIG. 5, FIG. 6, FIG. 8 and FIG. 10, in order to utilize the display housing 13 to position the backlight assembly 12 and the panel assembly 11, the light source 121 of the backlight assembly 12 can be positioned on a light positioning structure 13121 of the second assembling member 1312, e.g., by adhesive, and then the second assembling member 1312 can be combined with the first assembling member 1311. When the second assembling member 1312 is combined with the first assembling member 1311, an inserting portion IS is formed by and located between the second assembling member 1312 and the first assembling member 1311 and configured to accommodate a portion of the optical film structure 122 of the backlight assembly 12. Specifically, as shown in FIG. 10, the light positioning structure 13121 is formed on the second outer edge P2 of the second assembling member 1312 for positioning the light source 121, i.e., the light source 121 can be in an edge-type configuration. The inserting portion IS is located adjacent to the second outer edge P2 of the second assembling member 1312 and the second lateral part W2 of the first assembling member 1311. After the second assembling member 1312 is combined with the first assembling member 1311, a side portion of the optical film structure 122, e.g., a lower side portion of the optical film structure 122, can be inserted into the inserting portion IS, and then other portions of the optical film structure 122 can be positioned on the first assembling member 1311 and/or the second assembling member 1312, e.g., by adhesive, to achieve positioning of the optical film structure 122.

Afterwards, as shown in FIG. 6, the panel structure 111 of the panel assembly 11 can be positioned on a panel positioning structure 13111 of the first assembling member 1311 formed on a front side of the first assembling member 1311, e.g., by adhesive, and, as shown in FIG. 5, the circuit board 112 of the panel assembly 11 can be moved to a rear side of the second assembling member 1312. After the circuit board 112 of the panel assembly 11 is moved to the rear side of the second assembling member 1312, the lateral shell component 132 can be moved to locate the first portion 1321 and the second portion 1322 of the lateral shell component 132 respectively at a front side of the panel structure 111 and a rear side of the circuit board 112, and then the second portion 1322 of the lateral shell component 132 can be combined with the second assembling member 1312, e.g., by screwing. In such a way, the circuit board 112 can be positioned within a disposing portion DS formed by and located between the second portion 1322 of the lateral shell component 132 and the second assembling member 1312, and such configuration prevents a collision damage of the circuit board 112. After the second portion 1322 of the lateral shell component 132 is combined with the second assembling member 1312, the rear shell component 133 can be combined with the second assembling member 1312 and the second portion 1322 of the lateral shell component 132, e.g., by screwing, and combined with the first assembling member 1311 and the third portion 1323 of the lateral shell component 132, e.g., by a concave-convex fitting manner, for achieving assembly of the display device 1.

It should be noticed that, in this embodiment, the outer cover 131 can be a plate-shaped structure. In order to meet demands of lightweight and structural strength of the outer cover 131, a plane area of the first assembling member 1311 can account for 30~45% of a plane area of the outer cover 131, and a plane area of the second assembling member 1312 can account for 55~70% of the plane area of the outer cover 131. However, the present invention is not limited to this embodiment. It depends on practical demands. For example, in another embodiment, when the outer cover require a higher structural strength, the proportion of the plane area of the second assembling member to the plane area of the outer cover can be increased, and the proportion of the plane area of the first assembling member to the plane area of the outer cover can be decreased. In another embodiment, when the outer cover only requires a lower structural strength, the proportion of the plane area of the second assembling member to the plane area of the outer cover can be decreased, and the proportion of the plane area of the first assembling member to the plane area of the outer cover can be increased.

Understandably, in another embodiment, the second lateral part of the first assembling member can be in a detachable configuration for allowing the optical film structure to be installed straight from up to down, i.e., the second lateral part of the first assembling member can be combined with the third lateral part and the fourth lateral part of the first assembling member and the second assembling member after installation of the optical film structure for locating the side portion of the optical film structure within the inserting portion. Besides, in another embodiment, the light source can be in a direct-type configuration, e.g., the light source can be disposed on a side surface of the second assembling member facing toward the optical film structure.

Moreover, as shown in FIG. 3, FIG. 4 and FIG. 9, the display housing 13 further includes two first reinforcement components 134 and a plurality of second reinforcement components 135. The two first reinforcement components 134 and the plurality of second reinforcement components 135 are disposed on the first assembling member 1311 for increasing the structural strength of the first assembling member 1311. Specifically, the first reinforcement component 134 can be a metal plate detachably disposed on the first assembling member 1311 and having an H-shaped protruding structure. The second reinforcement component 135 can be an X-shaped protruding rib integrally connected to the first assembling member 1311. However, the present invention is not limited to this embodiment. Understandably, in another embodiment, the display housing can include only one first reinforcement component and/or one second reinforcement component. Alternatively, in another embodiment, there can be no reinforcement component.

Furthermore, in order to increase an overall recycling rate of the display housing 13, the first assembling member 1311 can be made of recyclable plastic material, and the second assembling member 1312 can be made of recyclable metal material. In such a way, the overall recycling rate of the display housing 13 can exceed 75%.

Figure 11:
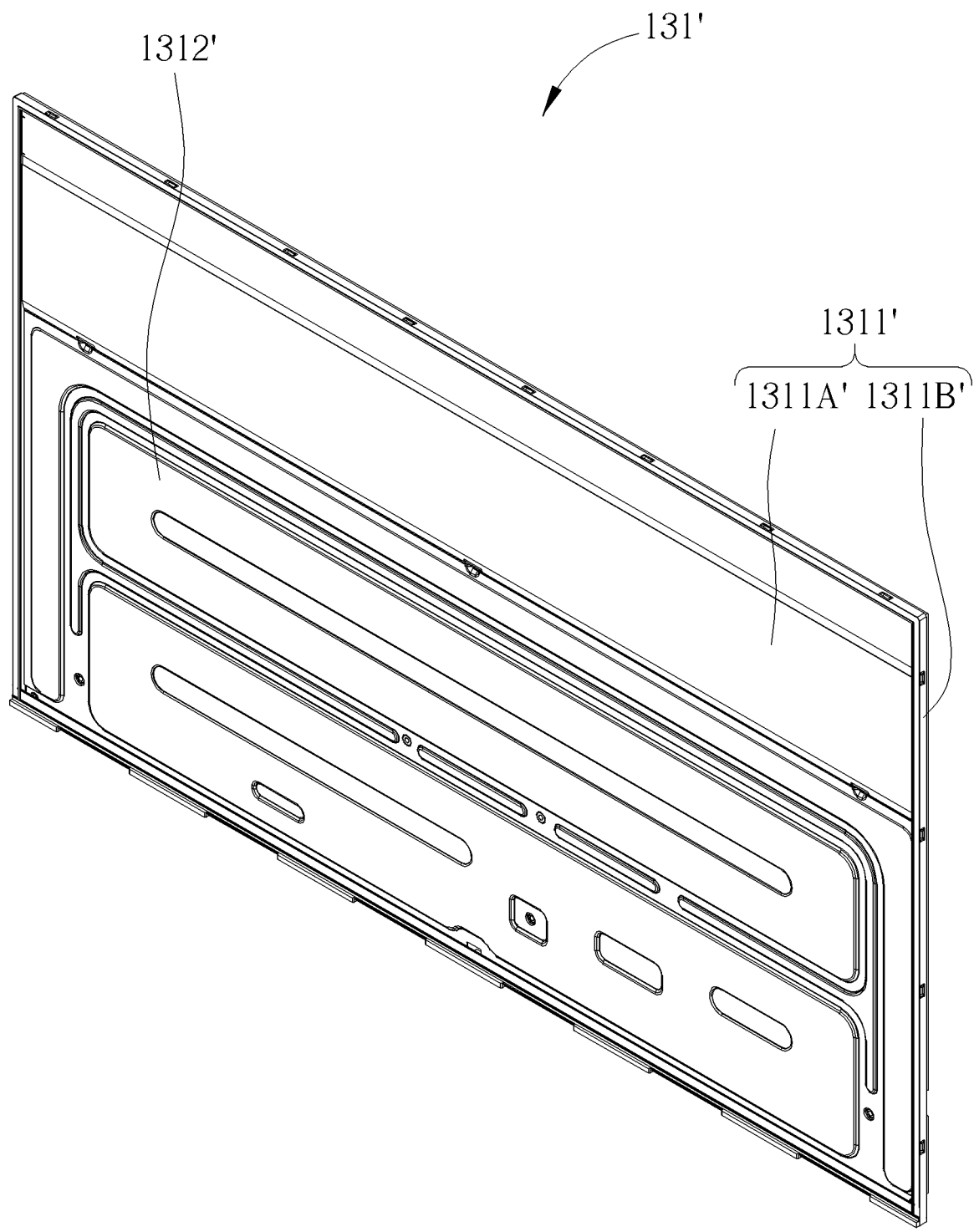
FIG. 11 and FIG. 12 are diagrams of an outer cover at different views according to a second embodiment of the present invention.
Figure 12:
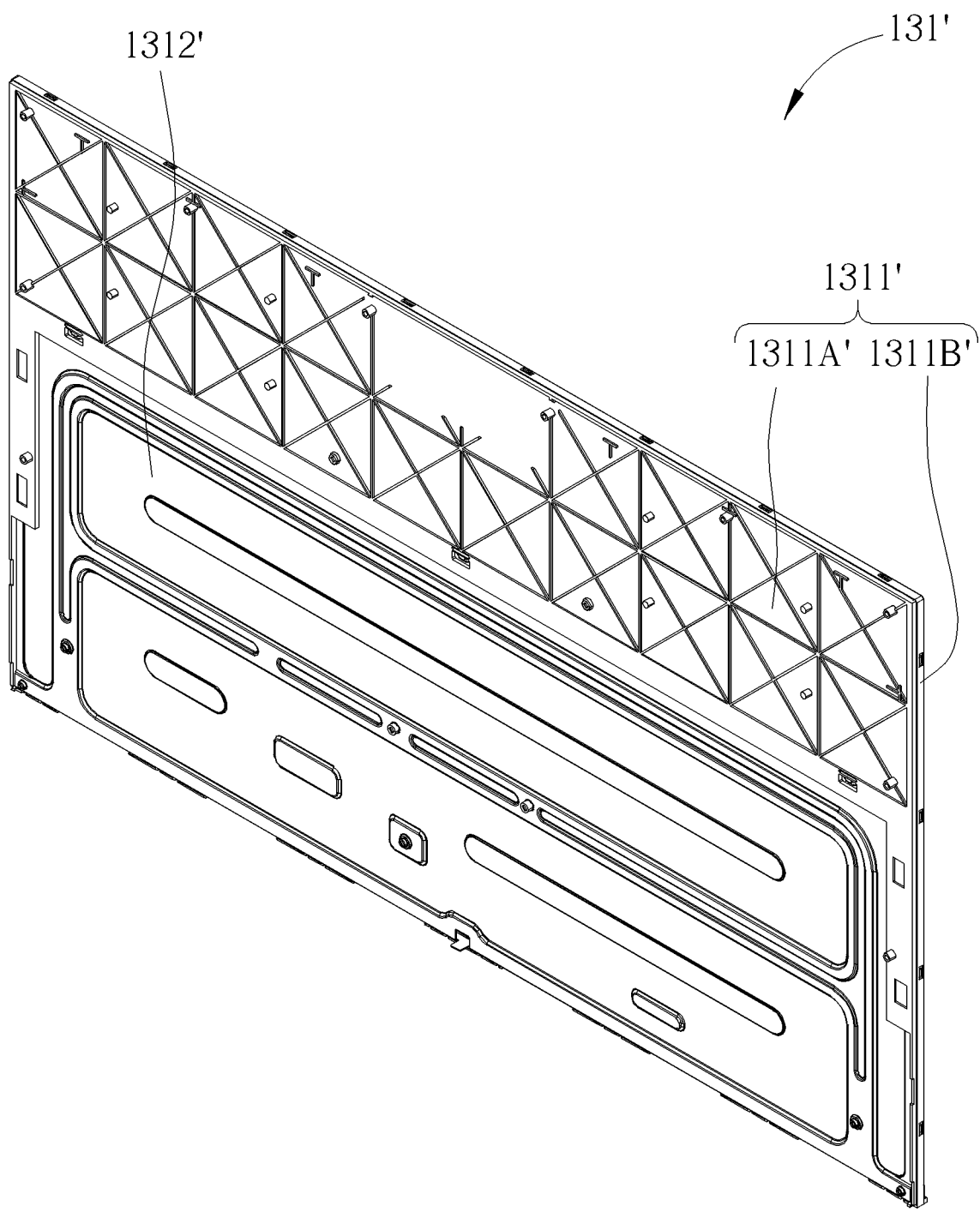
Figure 13:
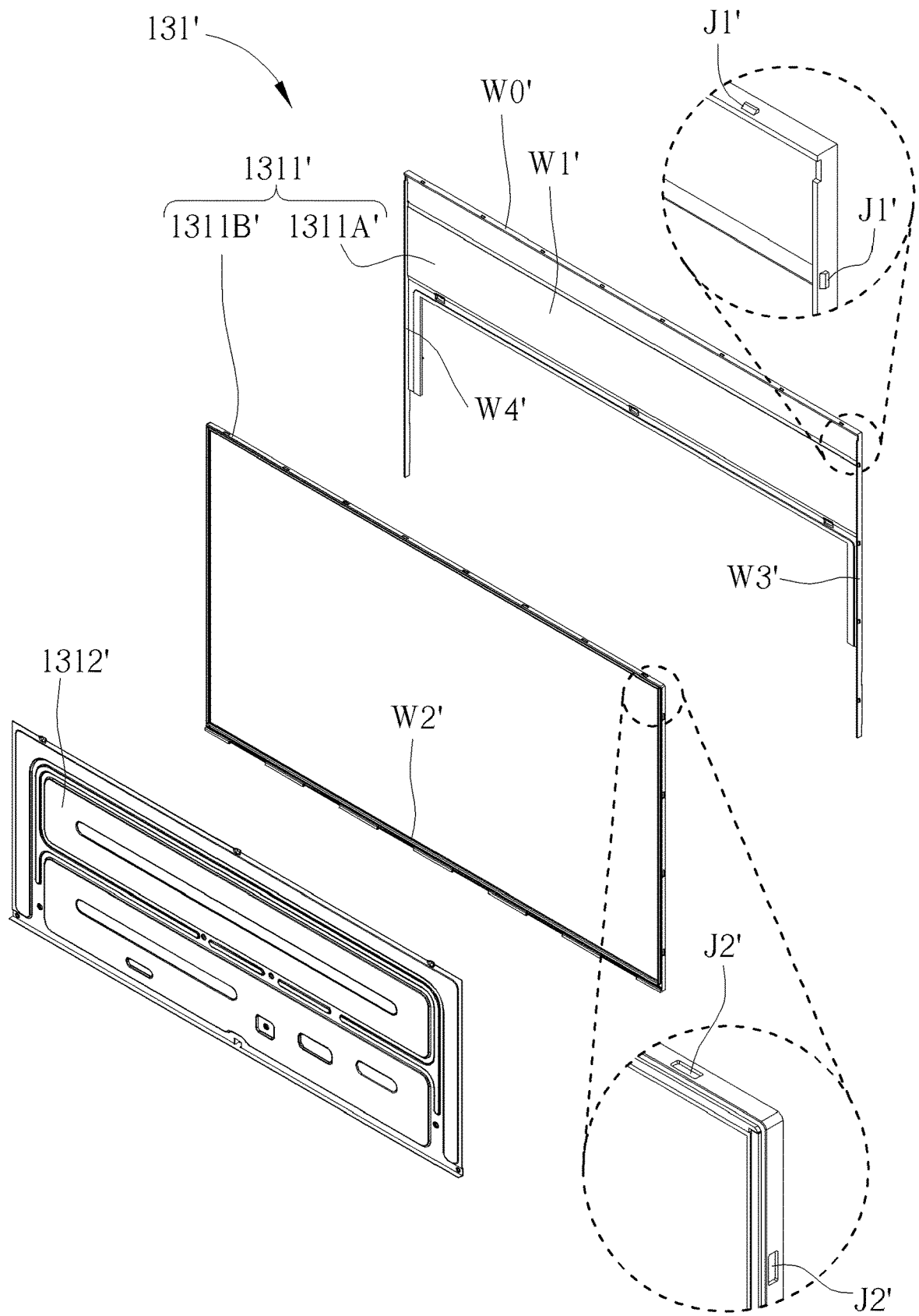
FIG. 13 and FIG. 14 are exploded diagrams of the outer cover at different views according to the second embodiment of the present invention.
Figure 14:
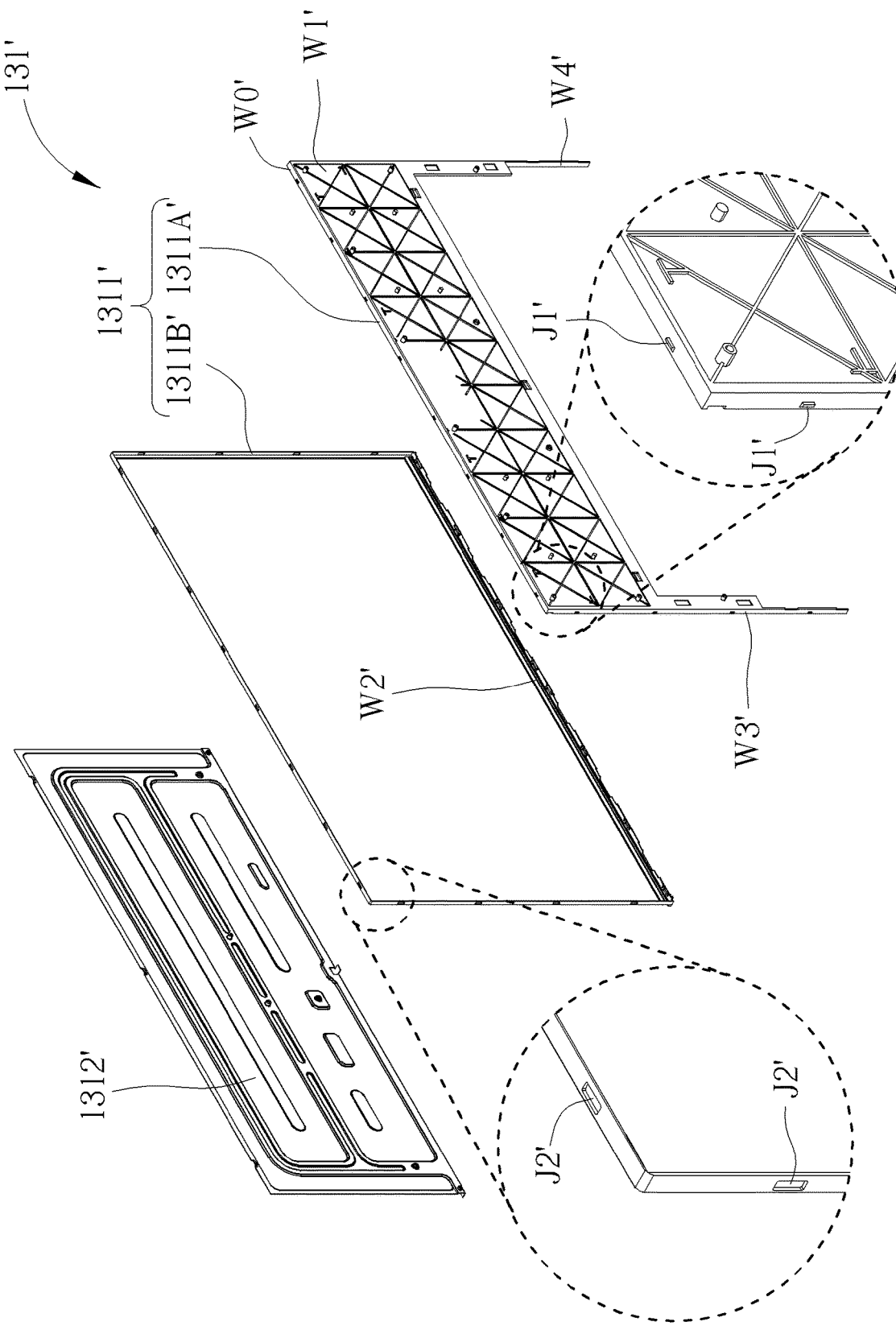
Figure 15:
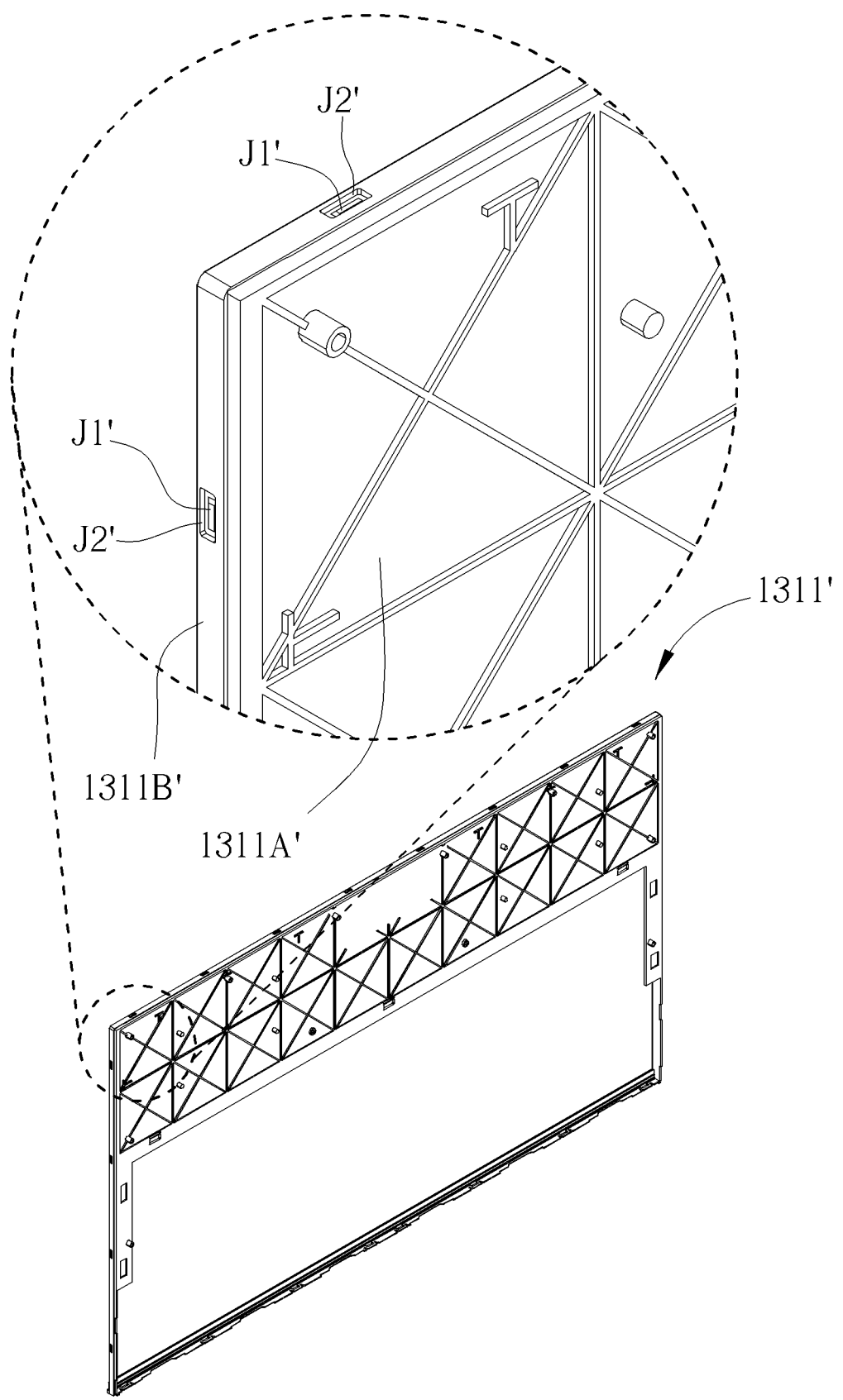
FIG. 15 is a partial enlarged diagram of a first assembling member according to the second embodiment of the present invention.

Please further refer to FIG. 11 to FIG. 15. FIG. 11 and FIG. 12 are diagrams of an outer cover 131' at different views according to a second embodiment of the present invention. FIG. 13 and FIG. 14 are exploded diagrams of the outer cover 131' at different views according to the second embodiment of the present invention. FIG. 15 is a partial enlarged diagram of a first assembling member 1311' according to the second embodiment of the present invention. As show in FIG. 11 to FIG. 15, the outer cover 131' includes the first assembling member 1311' and a second assembling member 1312'. Different from the first assembling member 1311 of the first embodiment, the first assembling member 1311' of this embodiment has a thinner and more uniform thickness. Besides, the first assembling member 1311' can be a two-piece structure and include a main body 1311A' and a frame body 1311B'. The main body 1311A' is detachably combined with the frame body 1311B'. The main body 1311A' and the frame body 1311B' form the opening structure cooperatively. Specifically, at least one engaging structure J1' is formed on the main body 1311', and at least one cooperating structure J2' is formed on the frame body 1312'. The engaging structure J1' and the cooperating structure J2' can be an engaging protrusion and an engaging hole, such that the main body 1311A' is detachably combined with the frame body 1311B' by a cooperation of the engaging structure J1' and the cooperating structure J2'. The main body 1311A' includes a first lateral part W0' having a vertical wall W1', a third lateral part W3' and a fourth lateral part W4', and the frame body 1311B' includes a second lateral part W2'. The vertical wall W1', the second lateral part W2', the third lateral part W3' and the fourth lateral part W4' are configured to form the opening structure. Other details of this embodiment are similar to the ones of the first embodiment. Detailed description is omitted herein for simplicity.

In contrast to the prior art, the display housing of the present invention utilizes the outer cover having the first assembling member and the second assembling member to position the panel assembly and the backlight assembly, and further utilizes the outer cover and the lateral shell component to form the disposing portion for accommodating the circuit board. The aforementioned configuration does not require any metal back plate or any shielding cover or any other element which cannot be recycled. Therefore, the present invention has a high recycling rate. Besides, since the present invention is lightweight, the present invention requires less packaging material, which causes less carbon emissions during packaging and/or transporting. Therefore, the present invention contributes to environmental sustainability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display housing comprising:
   an outer cover comprising:
      a first assembling member comprising an opening structure; and
      a second assembling member detachably connected to the opening structure;
   a lateral shell component detachably connected to the outer cover; and
   a rear shell component detachably connected to the outer cover and the lateral shell component;
   wherein the lateral shell component comprises a first portion, a second portion and a third portion, the first portion of the lateral shell component is located adjacent to a first side of the outer cover, the second portion of the lateral shell component is located adjacent to a second side of the outer cover opposite to the first side of the outer cover and detachably combined with the outer cover, the third portion of the lateral shell component is connected to the first portion and the second portion of the lateral shell component, the second portion of the lateral shell component is detachably combined with the second assembling member, a disposing portion is formed by and located between the second portion of the lateral shell component and the second assembling member, the rear shell component is detachably combined with the first assembling member, the second assembling member, the second portion of the lateral shell component and the third portion of the lateral shell component, and the disposing portion is configured to accommodate a portion of a circuit board.

2. The display housing of claim 1, wherein the first assembling member further comprises a first lateral part, a second lateral part, a third lateral part and a fourth lateral part, the first lateral part, the second lateral part, the third lateral part and the fourth lateral part form the opening structure cooperatively.

3. The display housing of claim 2, wherein at least one first engaging portion is formed on the first lateral part, at least one second engaging portion is formed on the second lateral part, at least one third engaging portion and at least one fourth engaging portion are formed on the second assembling member, and the at least one third engaging portion and the at least one fourth engaging portion are configured to respectively engage with the at least one first engaging portion and the at least one second engaging portion.

4. The display housing of claim 3, wherein when the at least one third engaging portion and the at least one fourth engaging portion respectively engage with the at least one first engaging portion and the at least one second engaging portion, a stopper of the at least one first engaging portion abuts against the at least one third engaging portion.

5. The display housing of claim 4, wherein a first extending portion is further formed on the first lateral part, a second extending portion is formed on the third lateral part, a third extending portion is formed on the fourth lateral part, a restraining portion is further formed on the second lateral part, and the first extending portion, the second extending portion, the third extending portion and the restraining portion abut against the second assembling member when the at least one third engaging portion and the at least one fourth engaging portion respectively engage with the at least one first engaging portion and the at least one second engaging portion.

6. The display housing of claim 1, wherein the first assembling member comprises a panel positioning structure configured to position a panel structure of a panel assembly, the second assembling member comprises a light positioning structure configured to position a light source of a backlight assembly, an inserting portion is formed by and located between the second assembling member and the first assembling member and configured to accommodate a portion of an optical film structure of the backlight assembly.

7. The display housing of claim 1, further comprising at least one reinforcement component disposed on the first assembling member and configured to increase a structural strength of the first assembling member.

8. The display housing of claim 1, wherein the first assembling member comprises a frame body and a main body detachably combined with the frame body.

9. The display housing of claim 8, wherein at least one engaging structure is formed on the main body, at least one cooperating structure is formed on the frame body, and the main body is detachably combined with the frame body by the at least one engaging structure and the at least one cooperating structure.

10. A display device comprising:
    a panel assembly;
    a backlight assembly; and
    a display housing configured to position the panel assembly and the backlight assembly,
       the display housing comprising:
       an outer cover comprising:
          a first assembling member comprising an opening structure; and
          a second assembling member detachably connected to the opening structure;
       a lateral shell component detachably connected to the outer cover; and
       a rear shell component detachably connected to the outer cover and the lateral shell component;
       wherein the lateral shell component comprises a first portion, a second portion and a third portion, the first portion of the lateral shell component is located adjacent to a first side of the outer cover, the second portion of the lateral shell component is located adjacent to a second side of the outer cover opposite to the first side of the outer cover and detachably combined with the outer cover, the third portion of the lateral shell component is connected to the first portion and the second portion of the lateral shell component, the second portion of the lateral shell component is detachably combined with the second assembling member, a disposing portion is formed by and located between the second portion of the lateral shell component and the second assembling member, the rear shell component is detachably combined with the first assembling member, the second assembling member, the second portion of the lateral shell component and the third portion of the lateral shell component, and the disposing portion is configured to accommodate a portion of a circuit board of the panel assembly.

11. The display device of claim 10, wherein the first assembling member further comprises a first lateral part, a second lateral part, a third lateral part and a fourth lateral part, the first lateral part, the second lateral part, the third lateral part and the fourth lateral part form the opening structure cooperatively.

12. The display device of claim 11, wherein at least one first engaging portion is formed on the first lateral part, at least one second engaging portion is formed on the second lateral part, at least one third engaging portion and at least one fourth engaging portion are formed on the second assembling member, and the at least one third engaging portion and the at least one fourth engaging portion are configured to respectively engage with the at least one first engaging portion and the at least one second engaging portion.

13. The display device of claim 12, wherein when the at least one third engaging portion and the at least one fourth engaging portion respectively engage with the at least one first engaging portion and the at least one second engaging portion, a stopper of the at least one first engaging portion abuts against the at least one third engaging portion.

14. The display device of claim 13, wherein a first extending portion is further formed on the first lateral part, a second extending portion is formed on the third lateral part, a third extending portion is formed on the fourth lateral part, a restraining portion is further formed on the second lateral part, and the first extending portion, the second extending portion, the third extending portion and the restraining portion abut against the second assembling member when the at least one third engaging portion and the at least one fourth engaging portion respectively engage with the at least one first engaging portion and the at least one second engaging portion.

15. The display device of claim 10, wherein the panel assembly comprises a panel structure, the first assembling member comprises a panel positioning structure configured to position the panel structure, the backlight assembly comprises a light source and an optical film structure, the second assembling member comprises a light positioning structure configured to position the light source, an inserting portion is formed by and located between the second assembling member and the first assembling member and configured to accommodate a portion of the optical film structure.

16. The display device of claim 10, wherein the display housing further comprises at least one reinforcement component disposed on the first assembling member and configured to increase a structural strength of the first assembling member.

17. An outer cover comprising:
a first assembling member comprising an opening structure, a first lateral part, a second lateral part, a third lateral part and a fourth lateral part, the first lateral part, the second lateral part, the third lateral part and the fourth lateral part form the opening structure cooperatively, at least one first engaging portion being formed on the first lateral part, and at least one second engaging portion being formed on the second lateral part; and
a second assembling member detachably connected to the opening structure, at least one third engaging portion and at least one fourth engaging portion being formed on the second assembling member, and the at least one third engaging portion and the at least one fourth engaging portion being configured to respectively engage with the at least one first engaging portion and the at least one second engaging portion;
wherein the second assembling member is detachably connected to the opening structure by being obliquely disposed through the opening structure and then rotated relative to the first assembling member.

18. The outer cover of claim 17, wherein the first assembling member comprises a frame body and a main body, at least one engaging structure is formed on the main body, at least one cooperating structure is formed on the frame body, and the main body is detachably combined with the frame body by the at least one engaging structure and the at least one cooperating structure.

\* \* \* \* \*